United States Patent [19]
Walker

[11] Patent Number: 6,131,682
[45] Date of Patent: Oct. 17, 2000

[54] ELECTRIC SOLENOID SHIFTER

[76] Inventor: Dale Walker, 320 Babe Thompson Rd., La Selva Beach, Calif. 95076

[21] Appl. No.: 09/218,994

[22] Filed: Dec. 22, 1998

[51] Int. Cl.⁷ ................................................... B62D 61/02
[52] U.S. Cl. ........................ 180/219; 180/230; 74/473.12
[58] Field of Search .................................... 180/219, 230; 74/473.12, 473.3, 500.5, 474, 490.11, 490.07, DIG. 6; 361/191, 169.1, 166; 307/10.1; 280/260

[56] References Cited

U.S. PATENT DOCUMENTS

| | | | |
|---|---|---|---|
| 4,930,366 | 6/1990 | Boucher et al. | 74/473.12 |
| 5,012,888 | 5/1991 | MacInnis | 74/473.12 |
| 5,299,652 | 4/1994 | Bevins | 180/219 |
| 5,569,104 | 10/1996 | Bellio et al. | 280/260 |
| 5,662,195 | 9/1997 | Rush | 74/474 |
| 5,868,034 | 2/1999 | McFadden | 74/473.12 |

*Primary Examiner*—Anne Marie Boehler
*Attorney, Agent, or Firm*—Jeffrey A. Hall

[57] ABSTRACT

An electric solenoid shifter for motorcycles for clutchless shifting of the motorcycle by pushing a button mounted on the handlebars of the motorcycle includes a solenoid mounting plate for securing a solenoid to the motorcycle and a micro-switch which is operably linked to the solenoid and mounted on the motorcycle. A cable clamp for securing a solenoid cable is secured to the solenoid and a spring is secured to the cable clamp and to a solenoid cable bracket. A locknut is secured to the solenoid cable bracket and a cable adjuster element is secured to the locknut. A gear shifter cable bracket assembly is operably secured to the solenoid cable and to a clevis, with the clevis being mounted to the motorcycle. An electric interrupt element for controllably interrupting the ignition system of the motorcycle is secured to the motorcycle and operably linked to the micro-switch and to a toggle switch. A control button is secured to the handlebars of the motorcycle for controlling the solenoid. The control button is operably linked to a relay element and to the solenoid.

10 Claims, 3 Drawing Sheets

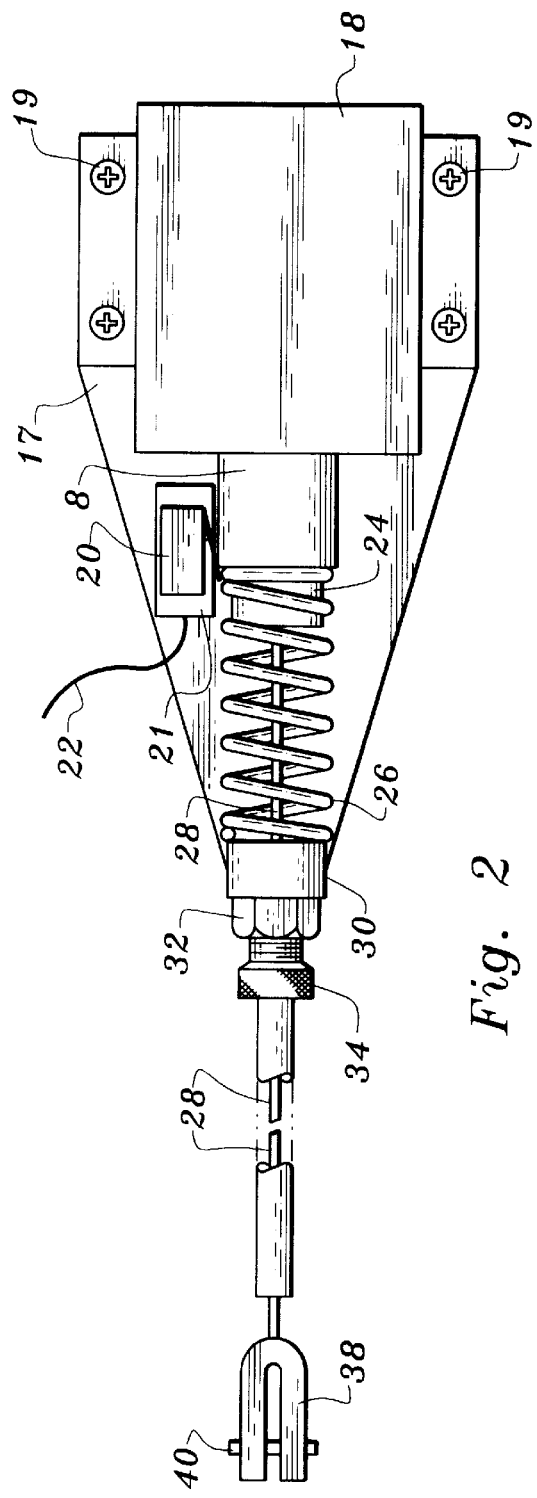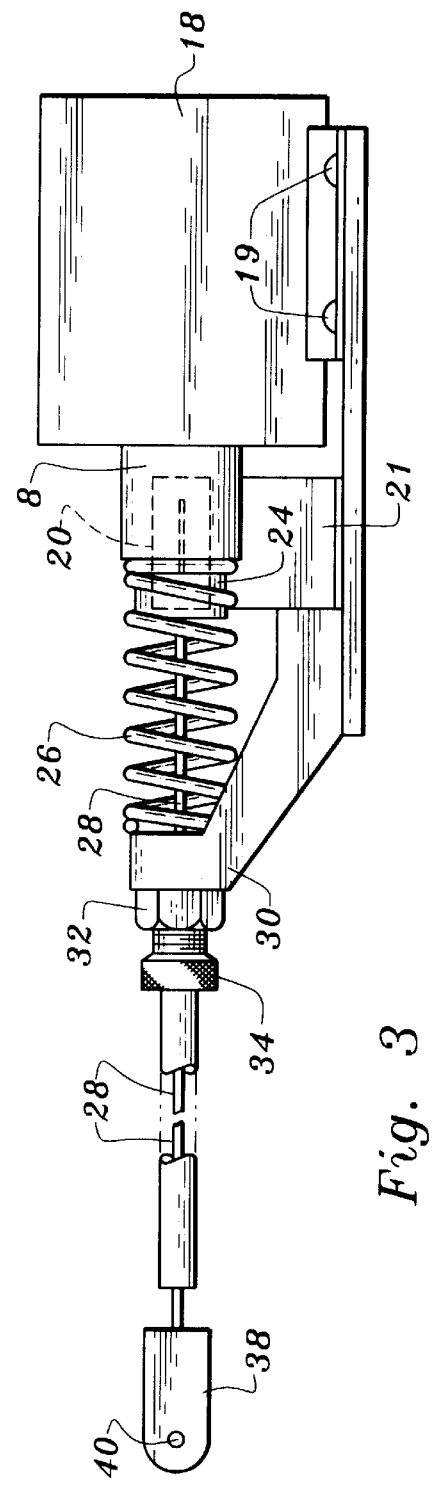

ELECTRIC SOLENOID SHIFTER

BACKGROUND OF THE INVENTION

1. Field of Invention

This invention relates to clutchless gear shifting apparatuses for wheeled vehicles, and more particularly to electric solenoid shifting apparatus for clutchless gear shifting for use on motorcycles, off-racing quads, racing go karts, and the like, 2. Description of the Related Art Various push button or clutchless shifting apparatuses have been proposed and implemented for motorcycles, off-road racing quads, and racing go karts. The most common push button automatic shifter is the air shifter type apparatus. Such apparatuses typically include an on board air compressor, a remote air tank, a shift ram, a switching valve, and air lines and air linked to a handle bar push button. Such apparatuses are significantly limited as they must be mounted on either the shift lever linkage, frame, engine or motor cycle shift pedal, in plain view.

The present invention provides an electric solenoid shifter which may be controlled by a button mounted on the handles bars of a wheeled vehicle such as a motorcycle, off road racing quads, or racing go kart. It may be remotely mounted and hidden on the vehicle and utilizes a cable to pull the shift foot pedal of such vehicles. Because it may be remotely mounted, the solenoid unit does not have to be mounted on the shift lever linkage, frame, engine, or motorcycle shift pedal.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

SUMMARY OF THE INVENTION

To achieve the foregoing objects, and in accordance with the purpose of the invention as embodied and broadly described herein, an electric solenoid shifter for motorcycles is provided for clutchless shifting of a motorcycle by pushing a button mounted on the handlebars of the motorcycle. The electric solenoid shifter includes a solenoid mounting plate for securing a solenoid to the motorcycle and a micro-switch operably linked to the solenoid and mounted on the motorcycle. A cable clamp for securing a solenoid cable is secured to the solenoid and to a spring. The spring is secured to the cable clamp and to a solenoid cable bracket. A locknut is secured to the solenoid cable bracket and a cable adjuster element is secured to the locknut. A gear shifter cable bracket assembly is operably secured to the solenoid cable and to a clevis, with the clevis being mounted to the motorcycle. An electric interrupt element for controllably interrupting the ignition system of the motorcycle is secured to the motorcycle and operably linked to the micro-switch and to a toggle switch. A control button is secured to the handlebars of the motorcycle for controlling the solenoid. The control button is preferably linked to a relay element and to the solenoid.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 2 is a top view of the solenoid, micro-switch, return spring, cable adjuster, and clevis of such electric solenoid shifter, according to the invention.

FIG. 3 is a side view of the solenoid, micro-switch, return spring, cable adjuster, and clevis of such electric solenoid shifter, according to the invention.

DESCRIPTION OF THE PREFERRED EMBODIMENTS

Reference will now be made in detail to the present preferred embodiments of the invention as illustrated in the accompanying drawings.

In accordance with the present invention, there is provided in a preferred embodiment of the invention, an electric solenoid shifter for motorcycles allowing for full or part throttle clutchless shifting of the motorcycle by pushing a button mounted on the handlebars of the motorcycle. The electric solenoid shifter includes a solenoid mounting plate for securing a solenoid to the motorcycle and a micro-switch operably linked to the solenoid and mounted on the motorcycle. A cable clamp for securing a solenoid cable is secured to the solenoid and to a spring which is secured to the cable clamp and to a solenoid cable bracket. A locknut is secured to the solenoid cable bracket and a cable adjuster element is secured to the locknut. A gear shifter cable bracket assembly is operably linked to the solenoid cable and to a clevis, with the clevis being mounted to the motorcycle. An electric interrupt element for controllably interrupting the ignition system of the motorcycle is secured to the motorcycle and operably linked to the micro-switch and to a toggle switch. A control button is secured to the handlebars of the motorcycle for controlling the solenoid. The control button is preferably linked to a relay element and to the solenoid.

In accordance with the present invention, there is also provided an improved hand controlled electric solenoid gear shifting apparatus for motorcycles. The apparatus comprises a solenoid mounting plate means for securing a solenoid to the motorcycle with a micro-switch linked to the solenoid. The micro-switch is operably mounted on the motorcycle at a desired position. A cable clamp means for securing a solenoid cable is operably secured to the solenoid and a spring is secured to the cable clamp means and to a solenoid cable bracket. A locknut is preferably secured to the solenoid cable bracket and a cable adjuster element secured to the locknut. A gear shifter cable bracket assembly is operably secured to the solenoid cable and to a clevis. An electrical interrupt means for controllably interrupting the ignition system of the motorcycle is secured to the motorcycle and is operably linked to the micro-switch. A control button is preferably secured to the handlebars of the motorcycle for controlling the solenoid, and is operably linked to a relay element. The relay element is communicatively linked to the solenoid.

Figure 1:
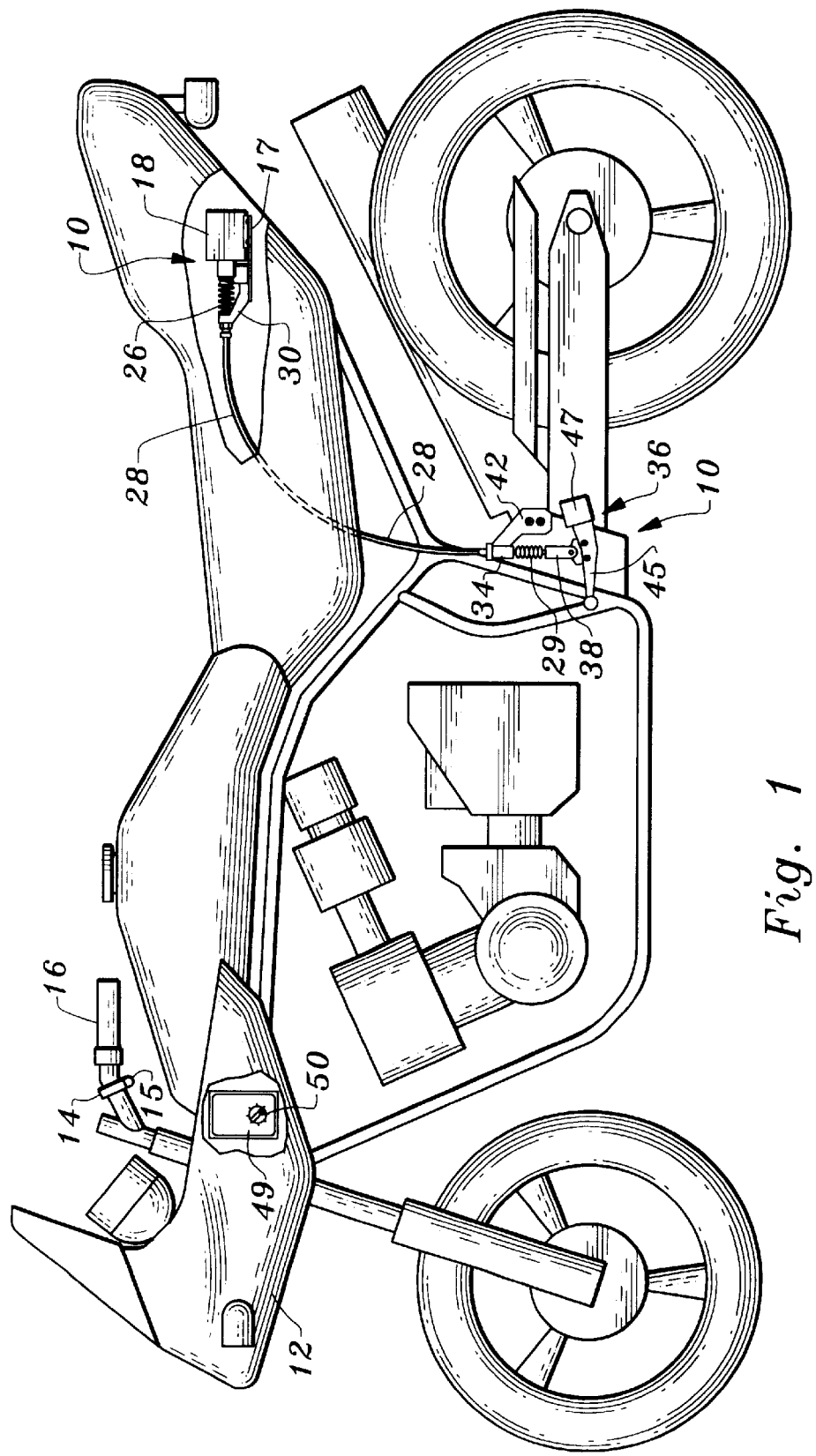
FIG. 1 is a side view of a motorcycle having an electric solenoid shifter mounted thereto, according to the invention.

In FIG. 1, the electric solenoid 10, is shown according to a preferred embodiment of the invention on motorcycle 12, allowing for clutchless full or part throttle shifting of the motorcycle by hand manipulation of button 15 mounted by button mounting bracket 14 on the handlebars 16 of motorcycle 12. A solenoid mounting plate 17 is secured with bolts or screws 19 to motorcycle 12. A micro-switch 20 is secured to mounting plate 17 by micro-switch bracket 21 and is communicatively linked to the solenoid 18. A wire 22, seen in FIGS. 2, and 5, links micro-switch 20 to electric interrupt element 49.

Figure 4:
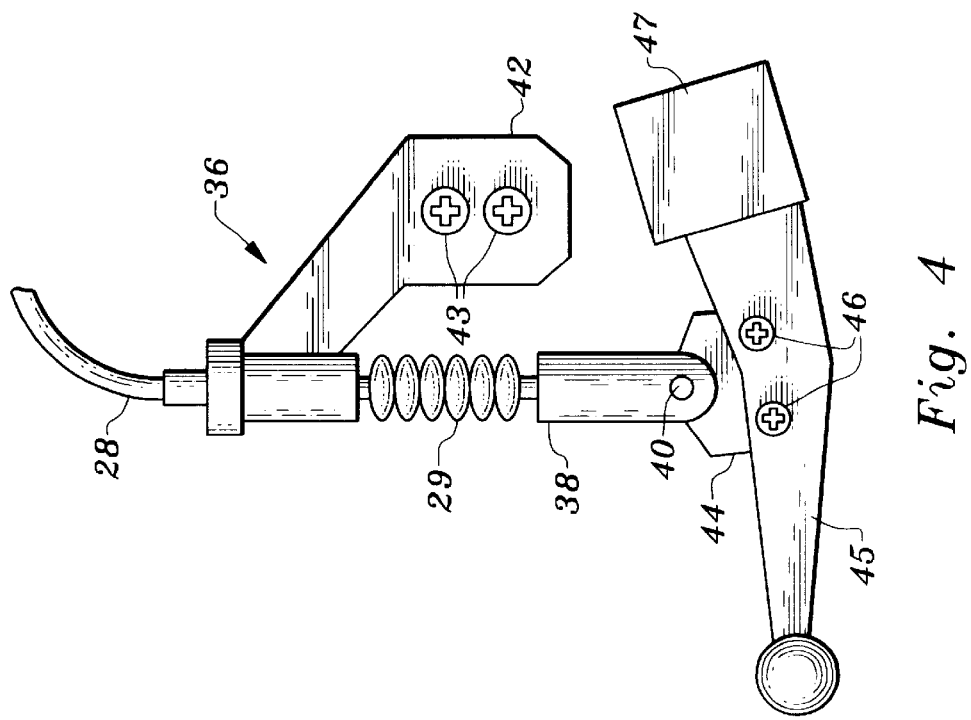
FIG. 4 is a side view of the clevis and clevis bracket secured to the motorcycle shift pedal of such electric solenoid shifter, according to the invention.

A cable clamp 24 is used to secure solenoid cable 28 to solenoid plunger 8 and solenoid 18. Solenoid cable 28 may have a dust cover 29, as seen in FIG. 4. A spring 26 is secured to cable clamp 24 and to solenoid cable bracket 30 as seen in FIGS. 1, 2, and 3. Spring 26 is used as a return spring and may be compressed or expanded between solenoid plunger 8 and solenoid cable bracket 30.

Best seen in FIGS. 2 and 3, a locknut 32 is secured to solenoid cable bracket 30 and to cable adjuster element 34. In FIGS. 2, 3, and 4, a gear shifter cable bracket assembly 36 is operably linked to solenoid cable 28 and to clevis 38. A shifter cable bracket 42 is preferably secured with bolts or screws 43 to the motorcycle frame or footpeg assembly of the motorcycle. Clevis 38 is preferably detachably secured to motorcycle shift pedal 45 with bolts 46. A foot peg 47 of motorcycle 12 is shown in FIG. 4. Clevis 38 may also be pinned directly to shift pedal 45.

Figure 5:
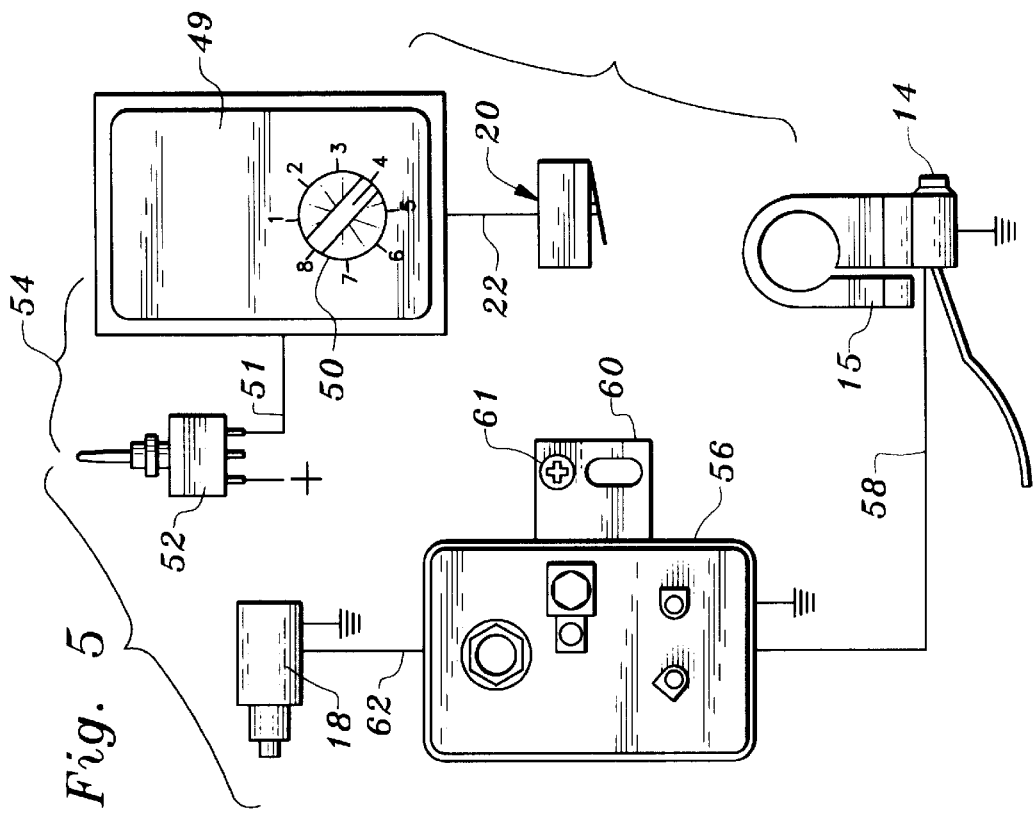
FIG. 5 is a schematic representation of the control button, relay, and electric interrupt means of such electric solenoid shifter, according to the invention.

With reference now to FIG. 5, electric interrupt means, which is preferably an electric "kill box" 49 or other ignition system interrupt mechanism, with controls 50 for pre-setting the engine kill. "Kill box" 49 is used to momentarily interrupt the ignition system of motorcycle 12 by shutting off the motorcycle engine for a preselected period of time. Preferably electric solenoid shifter 10 is configured with a toggle switch 52 linked via wire 51 to "kill box" 49. Toggle switch 52 preferably has a switch with three operable control positions, on, off, and a full by pass mode. When control button 15 on handlebars 16 is pressed, relay element 56 is activated via an electric signal transmitted through wire 58. Relay element 56 is preferably secured to motorcycle 12 with mounting tab 60 with screws or bolts 61. The relay element 56 then relays the electric signal to solenoid 18 via wire 62. Solenoid 18 moves in response to this electric signal and moves cable clamp 24 inward. Micro-switch 20 is then activated sending a ground signal to the electrical interrupt means, or "kill box" 49. "Kill box" 49 momentarily interrupts the ignition system of motorcycle 12 thereby shutting off the motorcycle engine for a predetermined period of time. This pre-set period of kill time is adjusted via dial control 50 of "kill box" 49. By shutting off the engine, the load is momentarily released on the transmission of motorcycle 12.

The movement of plunger 8 of solenoid 18 pulls solenoid cable 28 and shifter clevis 38 which is secured to shift pedal clevis bracket 44, which is preferably bolted to motorcycle shift pedal 45. With the movement of solenoid plunger 8 completed, the foot shift pedal 45 movement is also completed allowing for full engagement to the next upshift gear. As the gear shift is completed, "kill box" 49 turns the motorcycle ignition back on, allowing the engine to run under full or part throttle in the next upshifted gear.

In operation and use electric solenoid shifter 10 is very convenient, easy, reliable, and effective to use for push button automatic shifting of motorcycles, off-road racing quads, and other vehicles such as go-karts. Electric solenoid shifter 10 is easily secured to or removed from a motorcycle or other vehicle and may be mounted so that the only components in plain view are the shifter bracket assembly and a small portion of solenoid cable 28. Button mount bracket 14 for button 15 is also unique and preferably machined from solid billet aluminum so it will fit between the left hand grip and the original motorcycle left switch assembly. This allows button 15 to be mounted without having to modify the original left hand switch assembly of the motorcycle at all.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. An electric solenoid shifter for a motorcycle for clutchless shifting of the motorcycle by pushing a button mounted on the handlebars of the motorcycle, comprising:

a solenoid mounting plate for securing a solenoid with a solenoid plunger;

a micro-switch communicatively linked to said solenoid;

a cable clamp for securing a solenoid cable, said solenoid cable being operably secured to said solenoid;

a spring secured to said cable clamp and to a solenoid cable bracket;

a locknut secured to said solenoid cable bracket;

a cable adjuster element secured to said solenoid cable bracket;

a gear shifter cable bracket assembly operably secured to said solenoid cable, said gear shifter cable bracket assembly being secured to a clevis;

electrical interrupt means for controllably interrupting an ignition system; said electrical interrupt means being operably linked to said micro-switch and to a toggle switch; and a button securable to said handlebars of the motorcycle for controlling the solenoid, said button being operably linked to a relay element and to the solenoid.

2. The electric solenoid shifter of claim 1, wherein said micro-switch is secured to said solenoid mounting plate by a micro-switch bracket.

3. The electric solenoid shifter of claim 1, wherein said solenoid cable bracket is secured to said solenoid mounting plate.

4. The electric solenoid shifter of claim 1, further including a clevis bracket, said clevis bracket being secured to said clevis by a bolt.

5. The electric solenoid shifter of claim 4, wherein said clevis bracket is secured to said clevis by a pin.

6. A hand controlled electric solenoid gear shifting apparatus for motorcycles comprising:

solenoid mounting plate means for securing a solenoid;

a micro-switch linked to said solenoid;

cable clamp means for securing a solenoid cable, said solenoid cable being operably secured to the solenoid;

a spring secured to said cable clamp means and to a solenoid cable bracket;

a locknut secured to said solenoid cable bracket;

a cable adjuster element secured to said solenoid cable bracket;

a gear shifter cable bracket assembly operably secured to said solenoid cable, said gear shifter cable bracket assembly being secured to a clevis;

electrical interrupt means for controllably interrupting an ignition system; said electrical interrupt means being and operably linked to said micro-switch; and a control button secured for controlling the solenoid, said control button being operably linked to a relay element, said relay element being communicatively linked to the solenoid.

7. The hand controlled electric solenoid gear shifting apparatus of claim 6, wherein said micro-switch is secured to said solenoid mounting plate means by a micro-switch bracket.

8. The hand controlled electric solenoid gear shifting apparatus of claim 6, wherein said solenoid cable bracket, is secured to said solenoid mounting plate means.

9. The hand controlled electric solenoid gear shifting apparatus of claim 6 further including a clevis bracket is secured to said clevis by a pin.

10. The hand controlled electric solenoid gear shifting apparatus of claim 6, wherein said electric solenoid gear shifting apparatus is mounted so that it is hidden from view.

* * * * *